United States Patent

[11] 3,634,008

[72] Inventors Dexter Robert Plummer
Leicester;
John Denzil Barr, Oadby, both of England

[21] Appl. No. 729,953
[22] Filed May 17, 1968
[45] Patented Jan. 11, 1972
[73] Assignee The Rank Organisation Limited
London, England
[32] Priority May 18, 1967
[33] Great Britain
[31] 23,236/67

[54] AUTOMATICALLY ADJUSTING MOUNTING MEANS FOR STUDIO PICKUP DEVICES
11 Claims, 5 Drawing Figs.

[52] U.S. Cl. .......... 355/56, 178/DIG. 21, 178/DIG. 29, 178/DIG. 30, 179/1 R, 352/140
[51] Int. Cl. .......... H04m 5/24
[50] Field of Search .......... 178/DIG. 30, DIG. 29, 7.2 E, 6 R, 1 R, DIG. 21; 352/139, 140; 355/52, 56; 179/1 R; 250/203 CT

[56] References Cited

UNITED STATES PATENTS

| | | | |
|---|---|---|---|
| 3,315,032 | 4/1967 | Hecker | 250/203 CT |
| 3,419,674 | 12/1968 | Burns et al. | 178/DIG. 21 |
| 2,178,228 | 10/1939 | Goldsmith | 352/139 |
| 2,618,209 | 11/1952 | Silent | 178/7.2 E |
| 3,057,953 | 10/1962 | Guerth | 178/6 |
| 3,039,022 | 6/1962 | Guerth | 178/6.8 |

OTHER REFERENCES

IBM Technical Disclosure Bulletin vol. 5 No. 6 November 1962

*Primary Examiner*—Robert L. Richardson
*Assistant Examiner*—Donald E. Stout
*Attorney*—Griffin, Branigan and Kindness

ABSTRACT: A pickup device such as a camera or a microphone is adjustably mounted on a movable support. Signal-generating means on the support provide signals representing the movement of the support with respect to a subject of the pickup device and these signals are combined to provide a vector displacement signal. A control system mounted on the support receives the vector displacement signal and uses it to adjust the pickup device so that a predetermined relationship between the pickup device and the subject is maintained irrespective of movement of the support or the subject.

AUTOMATICALLY ADJUSTING MOUNTING MEANS FOR STUDIO PICKUP DEVICES

This invention relates to mounting systems for audio or visual sensing devices such as a camera or microphones, such as are employed in television and cinematographic studios.

According to the invention there is provided a mounting system for an audio or visual sensing device such as a camera or microphone, comprising a movable support, a mounting assembly for said sensing device mounted on the support and adjustable relative thereto, and a control system responsive to signals representative of the position or change in position of the support and/or the sensing device and effective to maintain a desired relationship between a said sensing device mounted on the mounting assembly and a subject irrespective of movement of the support and/or the sensing device.

In one embodiment of the invention, the mounting assembly is adapted to support a television or cinematographic camera and the control signal is effective to adjust a camera function so that the image in the camera of a subject under view is maintained in a desired state irrespective of support and/or camera movement. In the case where movement of the camera or a part of the camera such as movement of or part of, the camera objective is necessary to maintain the state of the image, an actuator driven by the control system is used to effect such movement.

In a further embodiment of the invention the mounting assembly is movable angularly with respect to the support to enable the sensing device to be aimed at any point on the subject under view, an actuator controlled by the control system being effective to orientate the sensing device so as to maintain said device aimed at said point irrespective of support movement.

Where the mounting assembly is adapted to support a camera an actuator controlled by the control system may be effective to adjust the focus setting of an objective lens on said camera so as to maintain in sharp focus a subject in the field of view of the camera irrespective of support and/or camera movement.

In a further embodiment of the invention the camera includes an objective lens unit of variable focal length, and the actuator is effective to adjust the focal length of said lens unit so as to maintain a constant size of an image in the camera of a subject irrespective of support and/or camera movement.

Conveniently, the control system includes at least one input connected to a demand unit which is effective to operate the respective actuator to establish initially the desired relationship between said sensing device and said subject, or to effect a desired change in said relationship.

In the case where the sensing device is mounted for displacement in three dimensions, a signal indicative of the vector displacement in any direction with respect to the subject may be obtained from any suitable combination of movement signals effective to produce a vector quantity. Such a vector quantity may be obtained from any one linear or curvilinear scalar measurement together with two independent angular measurements.

Alternatively two linear displacement measurements together with one angular displacement measurement may be suitably combined to produce the desired vector quantity. Three linear displacement measurements may also be suitably combined to produce the desired vector quantity.

The measurements may be obtained from any suitable position, acceleration or speed-responsive devices. Where the sensing device is a camera, the linear or curvilinear measurements of camera displacements relative to the subject are conveniently derived from measurements of the adjustments required in order to refocus the camera objective as the subject-camera distance varies as a result of camera displacement. Ultrasonic or radar ranging means may also be adopted to derive linear displacement measurements. Angular displacement measurements are derived from any angular position responsive transducer well known in the art. Suitable transducers are potentiometers, synchro shaft encoders, Hall effect devices or polarimeters.

A computing arrangement is conveniently utilized to modify and to process any scalar, linear and angular measurements which are necessary to produce the said vector quantity. The computing arrangement may be adapted to receive measurement signals, individually or in combination, in analogue or in digital form.

These measurement signals may be electrical, mechanical, hydrostatic or pneumatic and may be in the form of information carrying fluid flow, sonic energy, or electric or magnetic fields.

The means for driving the camera to produce angular orientation may be any actuator, for example any mechanical, electrical or hydrostatic actuator, well known in the art. The actuator used may in an embodiment derive its motive power from the actual displacement of the movable support.

An embodiment of the invention will now be particularly described by way of example, with reference to the accompanying drawings, in which.

Figure 1:
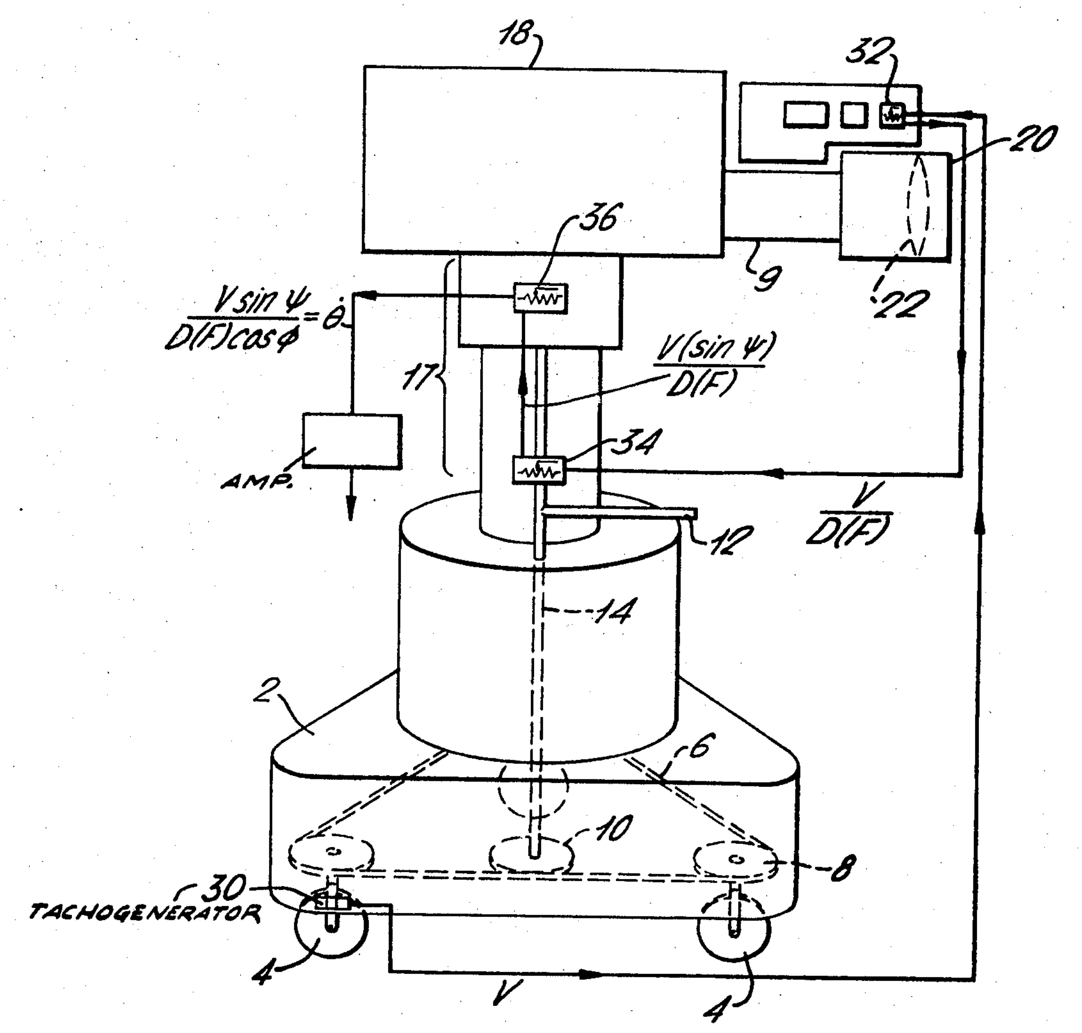
FIG. 1 is a schematic representation of a support for producing displacement of a television camera including a zoom objective and including means for producing a correcting signal effective automatically to pan the camera to keep it constantly aimed at a subject irrespective of camera displacement.

Referring to FIG. 1, the camera system comprises a trolley 2 having three pivotally mounted wheels which are disposed at the apices of a triangle and which are coupled so as to pivot in unison and provide steering of the trolley 2. In this embodiment sprockets 8 secured to the wheel pivots are coupled to a continuous chain 6, which is driven to pivot the wheels 4 in unison by being urged into engagement with a further driving sprocket 10. The sprocket 10 produces steering movement of the chain 6 by being coupled to a manually operated steering bar 12 by way of a shaft 14.

Supported upon the trolley 2, is a camera mounting assembly indicated generally at 17. The assembly includes a vertical stub shaft (not shown) upon which the camera indicated generally at 18 is mounted for a pivotal movement in a horizontal plane to produce panning thereof. Also included in the mounting assembly 17 is a horizontal shaft (also not shown) enabling the camera to pivot in a vertical plane to produce tilting thereof. Tilting and panning movements are produced by individual actuators of any kind well known in the art, for example those types of actuators hereinbefore referred to.

Suitably mounted at the front end of the camera, 8, is a zoom objective 9 providing a continuous variation of focal length over a range. Focusing of the objective upon subjects at varying subject distances from the camera is provided by axial movement of the focus lens element 22, within the objective.

Dealing first with pan compensation, it has been found that the rate of panning $\dot{\theta}$ which must be applied to the camera by the panning actuator, in order to keep the camera constantly aimed upon a stationary subject irrespective of camera displacement, is equivalent to $(-V \sin \psi / D(F) \cos \phi)$ where V is the scalar linear velocity of the camera and support, D(F) is the scalar separation between the camera and the subject, $\phi$ is the angle between the line of sight of the camera and the horizontal and $\psi$ is the direction of motion of the trolley 2 with respect to the horizontal projection of the line of sight. The arrangement shown in FIG. 1 is effective automatically to produce such panning compensation.

Referring again to FIG. 1, a velocity-responsive device in the form of a tachogenerator 30, is coupled to one of the driving wheels 4 of the trolley 2, and produces an output signal equivalent to the scalar velocity V of the trolley. The output signal V is applied to a linear potentiometer 32, which is coupled to the actuating mechanism of the focus element 22 and is effective to modify an input signal as a linear function of the focus setting and thereby of the separation D(F) between the camera and the subject. The input signal V thus will leave the potentiometer 32 as a signal V/D(F). This signal from potentiometer 32 is applied to a further angular position responsive device in the form of a sine potentiometer 34.

The stator and the rotor of the potentiometer 34 respectively are coupled to the steering drive shaft 14, and the assembly 17, or vice-versa, so that the potentiometer 34 is sensitive to the overall angular displacement $\psi$ of the camera relative to the direction of motion and, accordingly, produces an output signal $V\sin\psi/D(F)$. It will be apparent to those skilled in the art that a change in the direction of movement of the camera produces a change in the potentiometer 34. This output signal finally is applied to a third potentiometer 36 sensitive to the vertical angular displacement $\phi$ of the camera, and having secant law characteristics. This potentiometer accordingly modifies the input signal to produce an output signal $V\sin\psi/D(F)\cos\phi$ which is equivalent to the required pan-correcting signal.

The correcting signal is then applied directly or indirectly by way of an amplifier, to a panning actuator (FIG. 5) effective to produce sufficient panning of the camera to maintain constant the position in the camera picture the image of a selected point in the subject under view. The panning actuator may be arranged to receive an overriding signal from a panning demand unit, in order to change that point in the subject, the position of whose image is subsequently maintained stationary in the camera picture, or to allow for movement of the subject.

Figure 2:
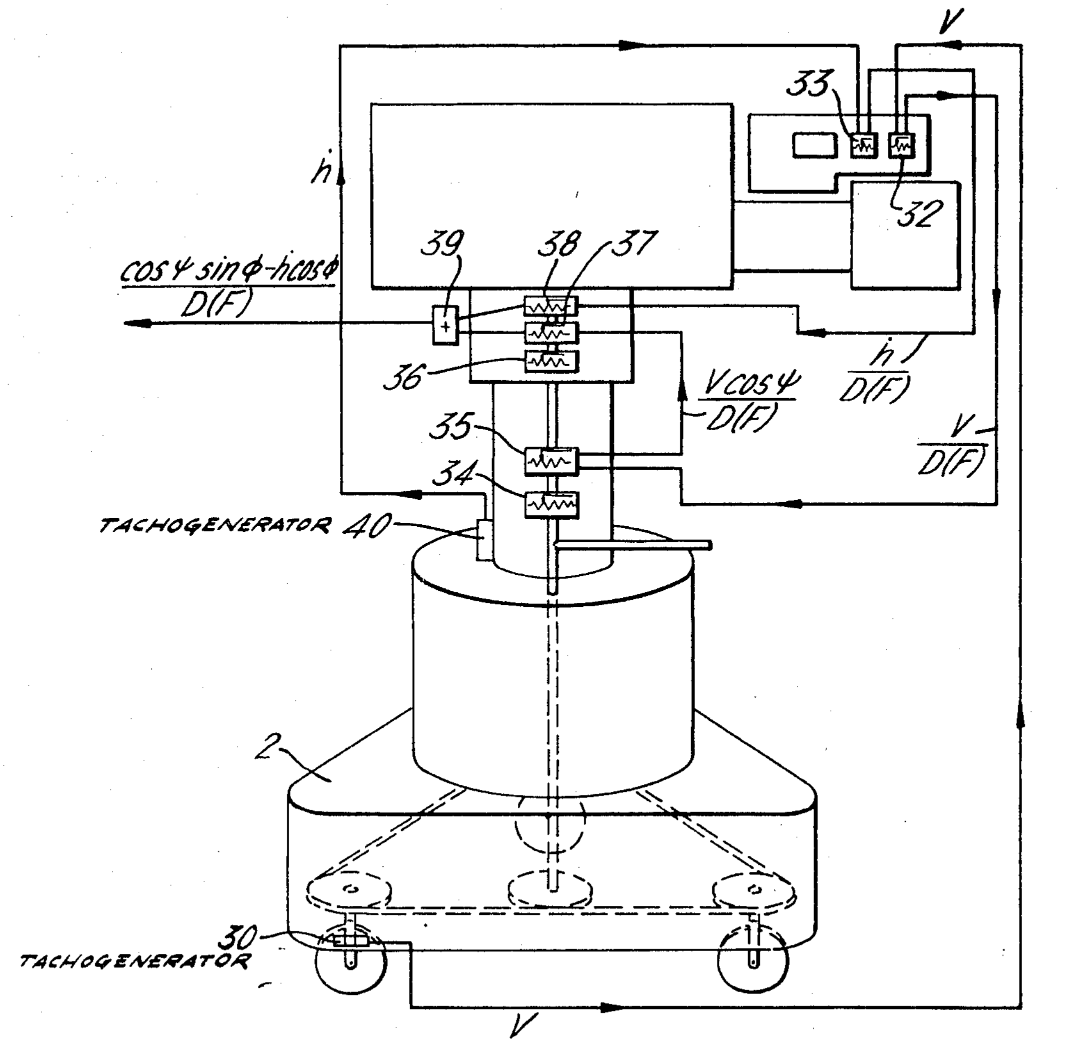
FIG. 2 is a schematic representation of the support of FIG. 1 and including means for producing a correcting signal effective automatically to tilt the camera to keep it constantly aimed at a subject irrespective of camera displacement.

The arrangement for producing sufficient compensating tilting $\dot{\phi}$ of the camera 18, in order to maintain a subject in the field of view as a result of substantially vertical camera displacement is shown in FIG. 2. In this case the rate of tilting $\dot{\phi}$ which must be applied to the camera to compensate for elevation changes and traction changes is $V\cos\psi\sin\phi - \dot{h}\cos\phi/D(F)$ where $\dot{h}$ is the rate of increase of height of the camera in a vertical direction.

Referring now to FIG. 2, the component $V\cos\psi\sin\phi$ of the tilting correcting signal is derived as follows:

The output signal from the tachogenerator 30 which is equivalent to the scalar velocity of the trolley 2, is applied to the potentiometer 32, which is coupled to the actuating mechanism of the focusing element 22 and emerges from the wiper of potentiometer 32 as a signal V/D(F). This signal is applied to a cosine potentiometer 35 sensitive to $\psi$ and emerges from the wiper of this potentiometer as an output signal of $V\cos\psi/D(F)$.

The output signal from potentiometer 35 is now applied to a suitable resolver or to one gang 37 of a sine-cosine potentiometer coupled to the pan mechanism of the camera and sensitive to pan movement $\phi$, and emerges from the sine wiper of this potentiometer as an output signal of $V\cos\psi\sin\phi/D(F)$.

The $\dot{h}\cos\phi$ component of the correcting signal is derived as follows:

A signal indicative of the rate of height increase $\dot{h}$ of the camera is produced in a tachogenerator 40 coupled between the trolley 2 and the vertically movable portion of the camera support 17. This signal $\dot{h}$ is applied to a potentiometer 33 also coupled to the actuating mechanism of the focusing element 22 of the zoom objective and emerges as a signal $\dot{h}/D(F)$.

Figure 5:
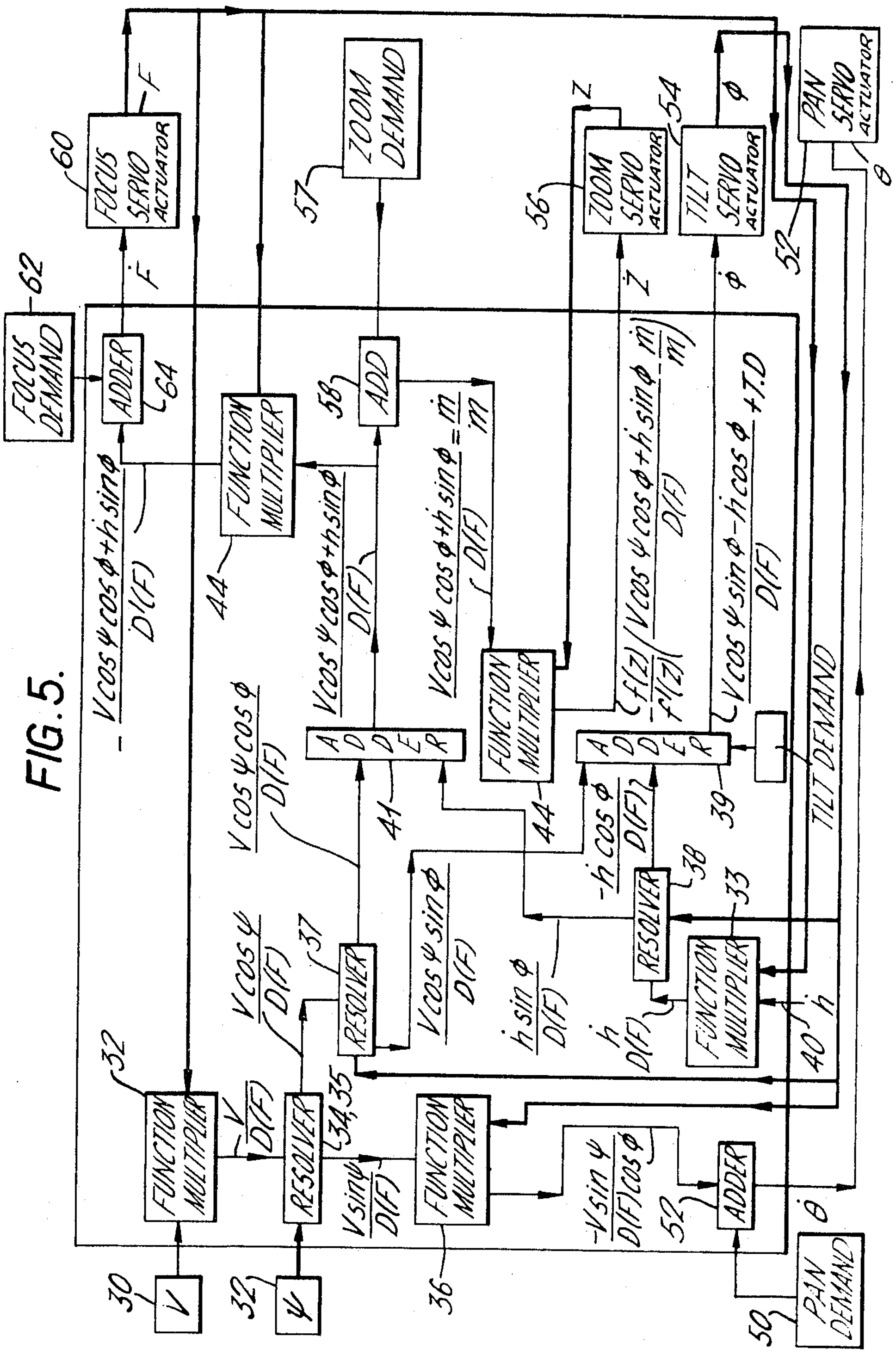
FIG. 5 is a schematic block diagram of a computing circuit effective to perform the combined functions of the correction signal producing circuits shown in FIGS. 1 to 4.

This signal is applied to a suitable resolver or to the other gang 38 of the potentiometer sensitive to $\phi$ and emerges as a signal of $\dot{h}\cos\phi/D(F)$ which is combined with the signal $V\cos\psi\sin\phi D(F)$ in any suitable adding circuit well known in the art, to produce the combined correcting signal required. As in the case of panning, this correcting signal is used to directly or indirectly drive a tilting actuator (FIG. 5). Again, as in the case of panning, the tilting actuator may be arranged to produce tilting on demand independently of correction tilting.

Buffering adding and inverting amplifiers of a kind well known to persons skilled in the art are inserted into the arrangements of FIGS. 1 to 5 where required. These additional circuit elements are not germane to the present invention and have accordingly been omitted for the sake of clarity.

Figure 3:
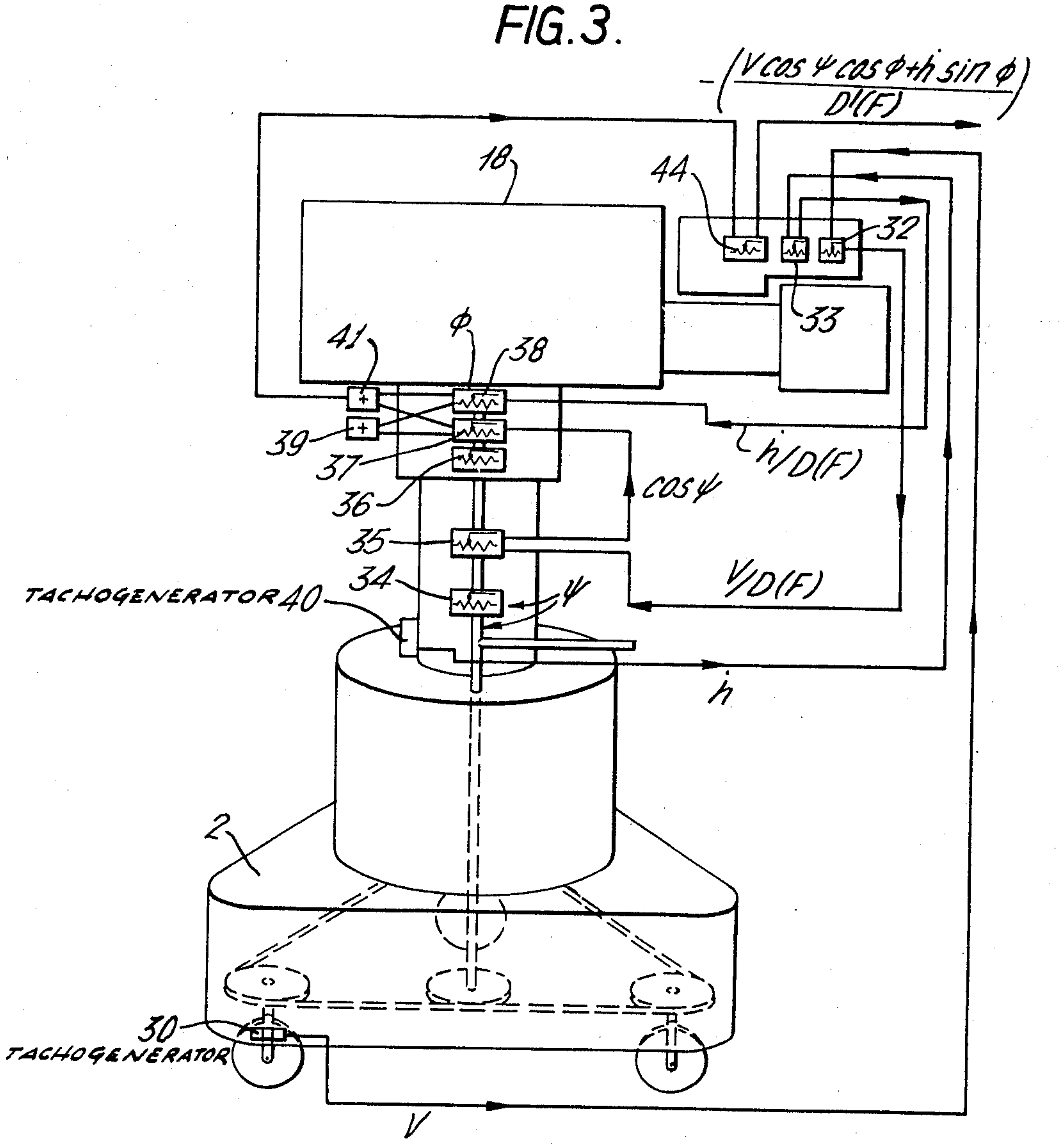
FIG. 3 is a schematic representation of the support of FIG. 1 and including means for producing a correcting signal effective automatically to maintain the camera zoom objective sharply focused upon a stationary subject irrespective of camera displacement.

The arrangement for producing correction of focus at a rate $\dot{F}$ and as a result of camera displacement is shown in FIG. 3. Referring to the figure, the required focus correction signal $-V\cos\psi\cos\phi + \dot{h}\sin\phi/D'(F)$ is in the manner of the previous arrangements, obtained by passing the scaler velocity signal V from tachogenerator 30 to one gang of the linear potentiometer 32, a second gang of which also receives the scalar velocity signal $\dot{h}$ derived from the tachogenerator 40. The resultant output signals V/D(F) and $\dot{h}/D(F)$ from the gangs of potentiometer 32, respectively are applied to a cosine potentiometer 35 and to the resolver 37, 38, or sine-cosine potentiometers 37, 38 and subsequently to adder 41. Adder 41 also receives the output signal $V\cos\psi/D(F)$ from potentiometer 34. Potentiometers 38, 37 accordingly produce two outputs $\dot{h}\sin\phi/D(F)$ and $V\cos\psi\cos\phi/D(F)$ which are summed in the adder 41 and applied to a potentiometer 44 which may in some cases be substantially linear also coupled to the actuator moving the focus element 22 of the zoom objective. The input signals modified in potentiometer 44 are thus combined as an output signal of $-V\cos\psi\cos\phi + \dot{h}\sin\phi/D'(F)$ which is the focus rate signal necessary to produce focus correction as a result of camera displacement.

An overriding focus signal effective to change the focus condition and derived from a demand unit, may be suitably added into any convenient point in the focus correction system.

Figure 4:
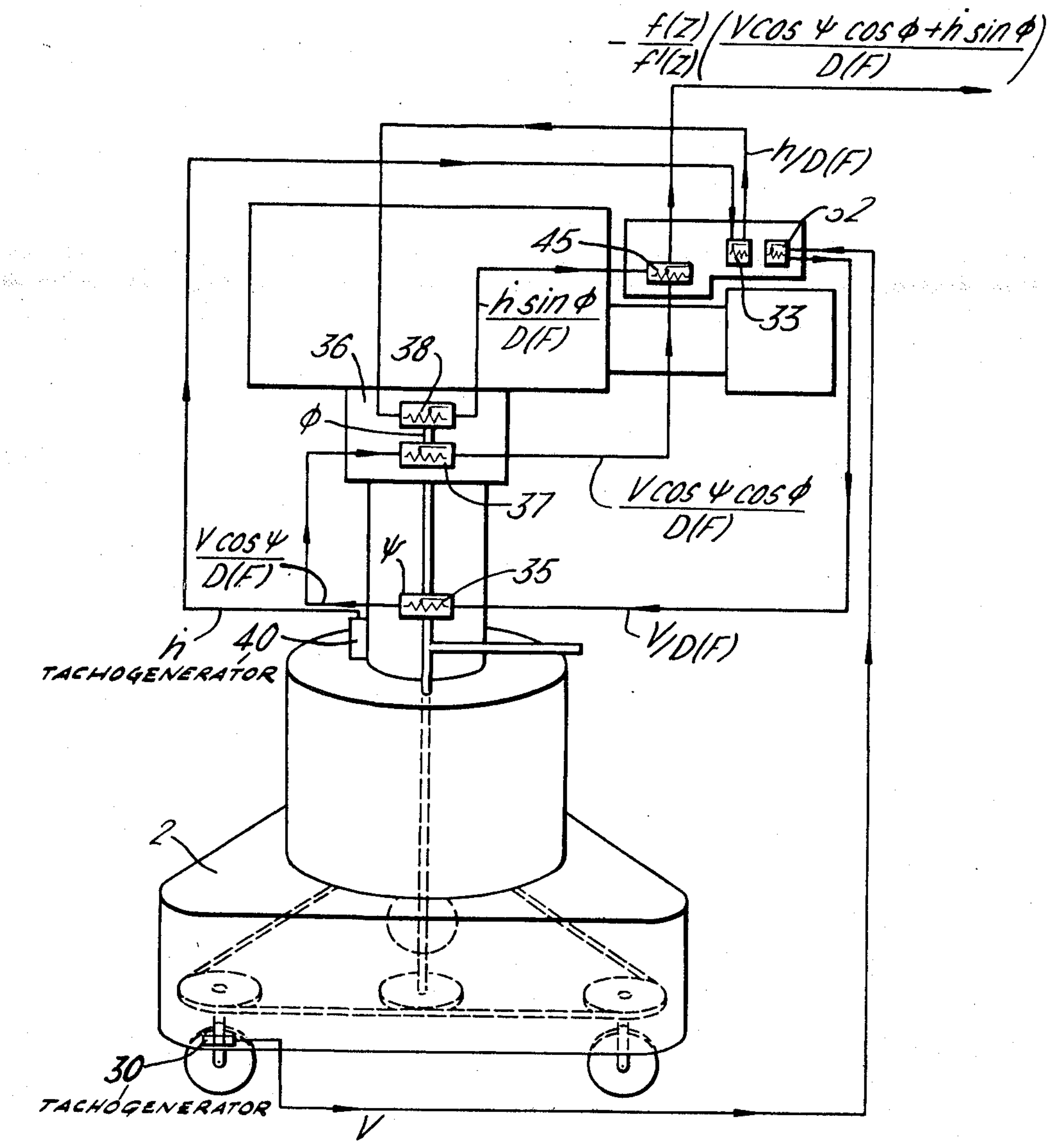
FIG. 4 is a schematic representation of the support of FIG. 1 and including means for producing a correction signal effective automatically to maintain the camera constantly zoomed upon a stationary subject irrespective of camera displacement.

In the case where the focal length or zoom setting of the camera objective is also to be maintained in spite of camera displacement, the arrangement shown in FIG. 4 may be used. In this arrangement of FIG. 4, the focal length correction signal is $$\frac{-f(z)}{f'(z)}\left(\frac{V\cos\emptyset\cos\phi + \dot{h}\sin\phi}{D(F)}\right)$$

where $f(z)/f'(z)$ is proportional to the change in camera subject distance.

This correction signal necessary to maintain a constant zoom setting irrespective of camera displacement, is derived by passing the scalar signal V from tachogenerator 30 into potentiometer 32 which also receives the $\dot{h}$ signal from tachogenerator 40. The resultant output signal V/D(F) from potentiometer 32 is passed through the cosine portion of sine-cosine potentiometer 34 sensitive to $\psi$ to produce a signal $V\cos\psi/D(F)$ which is then applied to the potentiometers 37, 38 together with the output signal $\dot{h}/D(F)$ from potentiometer 33. The outputs $\dot{h}\sin\phi/D(F)$ and $V\cos\psi\cos\phi/D(F)$ respectively obtained from potentiometers 38, 37 are applied to another potentiometer 45 driven by the mechanism actuating the zoom element of the objective (FIG. 5) and modifying an input signal as a function of the zoom setting of the objective. The input signals modified in potentiometer 45 are combined in a suitable adder as an output of $$\frac{-f(z)}{f'(z)}\,\frac{(V\cos\emptyset\cos\phi + \dot{h}\sin\phi)}{D(F)}$$

which is the required correction signal.

As in all previous cases, an overriding zoom demand signal derived from a demand element may be suitably injected into any convenient point in the correction arrangement to produce overall zoom setting changes, or to maintain constant zoom on a moving subject.

It will be appreciated that many of the signal components used to produce pan, tilt, focus or zoom correction signals are common to two or more of these functions. Accordingly, many of the circuit elements devices and transducers producing these component signals may be suitably incorporated into a computing arrangement in which they perform two or more functions. Such a computing arrangement incorporated into a control circuit for driving the pan, tilt, focus and zoom actuators is shown in FIG. 5, the computing arrangement being constructed to produce pan, tilt, focus and zoom correction signals from the camera movement indicating devices or transducers in an economic manner. It will be appreciated that while the arrangement of FIG. 5 represents one effort to optimize the production of the various correction signals in an economic manner, it is not the only possible arrangement, and alternatives providing different signal-modifying operations in the same or different circuit elements are possible to achieve the same result.

Referring to FIG. 5, the various devices referred to in FIGS. 1 to 4 are identified by the same reference numerals, mechanical and electrical couplings respectively being indicated in thick and in thin lines. Also devices are indicated in square boxes, signals produced by these devices being enclosed by rounded boxes. The function of this circuit which combines the function of the arrangements shown in FIGS. 1 to 4 will be clearly apparent from the drawings so that a detailed description is unnecessary. However, purely as an example, it will be seen that the V and $\dot{h}$ signals respectively produced in the tachogenerators 30 and of FIGS. 1 to 4 are applied to function multipliers 32 which is the potentiometer 32 in the case where the signals are in analogue form.

However, it will be appreciated that the devices 30 and 40, as well as the remaining function multiplying and other devices may produce signals in digital form, in which case the function multipliers resolvers and other components in the computing arrangement would be adapted to handle digital information. Referring again to FIG. 5, in which mechanical and electrical couplings respectively are shown in the thick and thin lines, the panning rate correction signal $\dot{\phi}$ produced is the same as that shown in FIG. 1. An overriding pan demand signal from a demand unit 50 is injected to the adder 52, the total pan signal comprising the correction signal and the demand signal being applied to a pan servo 52 which pans the camera through an angle $\phi$.

It will also be apparent from FIG. 5, that tilting is produced by a tilt servo 54 and zooming by a zoom servo 56, overriding zoom demand from the demand unit 57 being added in this case at the adder 58. Focusing is produced in the focus servo 60, overriding focus demand from the demand unit 62 being injected into the adder 64.

In an alternative embodiment of the invention, signals indicative of the displacement of the camera can be obtained by measuring the coordinates or changes in the coordinates of any suitable point in the camera, and differentiating the coordinate signals to produce the displacement rate information used in the embodiment of FIGS. 1 to 5. Alternatively, the coordinate signals may be used in combination with the assumed or measured coordinates of the subject under view in order to compute the orientations of the camera which are essential to produce the correct aiming, focusing and zooming. Polar coordinate position information can be obtained from suitable angular position responsive devices such as potentiometers, and can, if desired, be converted by any suitable means into cartesian coordinate position information which subsequently may be converted into rate information, or may be directly used to produce correction signals.

Even where no change in camera position is required for artistic purposes by the operator, it may be desirable to feed into the system disclosed an additional correcting signal to negate a buildup of error with time, which may arise with some systems, or to follow a moving subject. Such additional corrections would be derived from one or more of a variety of sources, for example range errors could be corrected by an autofocus system as described in our Pat. application 30,267/65, refiled as 31,629/66, or both range and direction signals could be obtained by a radar or sonar device, using a transponder or a passive reflector attached to a subject.

The system of the present invention may in combination with many configurations of camera mounting (the name given to the device which supports, and is used in the displacement of, the camera) and the following examples of mounts are mentioned merely by way of example:

The vehicle known in TV usage as a "Pedestal"

The vehicle made and publicized by Messrs. Vinten known as "Peregrine"

The mounting system disclosed in our copending application

A nonspecialized vehicle, e.g., Helicopter, airplane, motor car, tracked vehicle, ship.

It will be appreciated that if a camera is taking a particular subject, i.e., it is pointed at and focused on the subject, and the lens is of such focal length that the subject fills the frame to the satisfaction of the operator, and the camera is then displaced to achieve a desired change of viewpoint, then the camera will, in general, and in the absence of the present invention be wrongly pointed, wrongly focused and the lens will be of the wrong focal length. Correction of pointing, focusing and zooming is thus difficult and time consuming, or, more seriously, if it is required to take a "continuous" picture while the viewpoint is changing, and this is a frequent requirement in TV and cine production, the operation requires a team of operators working in unison. This is very difficult and may require much time in rehearsal as well as requiring operator skills which are difficult to attain.

The use of the arrangement according to the present invention makes it possible automatically to correct for any or all of the errors of camera pointing, focusing or changing focal length as a result of camera displacement, without the necessity of intervention by the operator. This makes it possible to superimpose upon the automatic corrections applied, any desired changes of aiming, focusing or focus changes to produce changes as a result of subject movement, whether these superimposed changes are produced by the operator or alternatively are obtained as a predetermined sequence of data from suitable means such as a storage device.

Moreover, it will be appreciated by those skilled in the art that the mounting system herein described is applicable to the control of audio sensing devices such as microphones as well as visual sensing devices such as cameras. Thus, for example, the systems shown in FIGS. 1 and 2 may be employed to maintain a microphone aimed at a subject irrespective of movements of the microphone support relative to the subject. It will also be appreciated that an output signal from the control system can be used to control a camera function, for example an electronic circuit effective to maintain a desired image state.

We claim:

1. Mounting means for studio pickup devices such as cameras and microphones, said mounting means comprising:

a movable support, a mounting assembly mounted on said support, adjustment means on said support for adjusting the position of said mounting assembly relative to said support, a pickup device on said mounting assembly, first transducer means mounted on said support and responsive to movement of the support to generate a first signal representing a measurement of linear displacement of said support, second transducer means for generating further signals representing displacement of the mounting assembly, signal-generating means for deriving, from said first signal and said further signals, signals representative of the vector displacement of said movable support in any direction relative to a subject, and a control system responsive to said signal-generating means for maintaining a predetermined relationship between said pickup device and said subject irrespective of movement of the support.

2. Mounting means according to claim 1, wherein said second transducer means are operative to generate said further signals from two independent angular measurements.

3. Mounting means according to claim 1, wherein said second transducer means are operative to generate said further signals from a linear displacement measurement and an angular measurement.

4. Mounting means according to claim 1, wherein the pickup device is a camera and measurements of camera distance from the subject are derived from measurements of the adjustments made in order to refocus the camera as said distance varies.

5. Mounting means according to claim 1, wherein said signal-generating means comprises a computing arrangement operative to modify and process said first signal and said further signals to provide said signals representative of said vector displacement.

6. The mounting means of claim 5, wherein the computing arrangement is adapted to receive and process analogue signals.

7. The mounting means of claim 6 wherein said signals are electrical signals.

8. The mounting means of claim 1, wherein said mounting assembly is movable angularly relative to said movable support whereby said pickup device can be pointed at any point on the subject, and including an actuator on said mounting assembly said actuator being controlled by said control system whereby said pickup device is maintained pointed at a predetermined point on said subject irrespective of movement of said support.

9. The mounting means of claim 1 wherein said pickup device is a camera, and including

- an adjustable focus objective lens for said camera,
- an actuator controlled by said control system, and
- means interconnecting said actuator and said objective lens, said interconnecting means transmitting movement of said actuator and thereby adjusting said adjustable focus objective lens in response to movement of said actuator whereby the focus of said objective lens is maintained to produce a focused image of said subject irrespective of movement of said support.

10. The mounting means of claim 1 wherein said pickup device is a camera, and including

- an objective lens unit of variable focal length on said camera,
- an actuator controlled by said control system, and
- means interconnecting said actuator and said objective lens unit, said interconnecting means transmitting movement of said actuator to said variable focal length objective lens unit and thereby adjusting said variable focal length objective lens in response to movement of said actuator whereby said focal length of said lens unit is adjusted to maintain constant the size of an image in said camera irrespective of movement of said support.

11. The mounting means of claim 1, wherein the signals representative of the vector displacement of said movable support indicating velocity are measurements of velocity of the movable support.

* * * * *